July 3, 1962

J. MAURICE ETAL 3,042,164

ELECTROMAGNETIC CLUTCHES

Original Filed July 6, 1955

July 3, 1962  J. MAURICE ETAL  3,042,164
ELECTROMAGNETIC CLUTCHES
Original Filed July 6, 1955  7 Sheets-Sheet 2

United States Patent Office 3,042,164
Patented July 3, 1962

3,042,164
ELECTROMAGNETIC CLUTCHES
Jean Maurice and Michel Rist, Paris, France, assignors to Societe Anonyme Française du Ferodo, Paris, France, a corporation of France
Original application July 6, 1955, Ser. No. 520,278, now Patent No. 2,865,480, dated Dec. 23, 1958. Divided and this application Oct. 7, 1958, Ser. No. 765,807
Claims priority, application France July 12, 1954
4 Claims. (Cl. 192—84)

This application is a division of our former application Serial No. 520,278, filed July 6, 1955, now Patent 2,865,480, patented December 23, 1958.

The present invention relates to a mounting arrangement for mounting on a flanged end, so called "rear end," of a driving shaft, an electromagnetic clutch unit including an annular magnet core having a rear magnetic attracting face, an annular armature disposed rearwardly of said magnet core and having a front magnetic face operatively associated with the said core attracting face, circumferentially disposed connecting means connecting said armature with said magnet core to prevent relative rotation between the armature and the magnet core, a first friction plate disposed rearwardly of said armature and having a rear friction face, circumferentially disposed first screws extending through first apertures in the first friction plate and screwed in the magnet core, a second friction plate disposed rearwardly of said first friction plate and having a front friction face, and circumferentially disposed second screws extending through second apertures in the second friction plate and screwed in the armature, said first and second friction faces being arranged for frictional engagement with a driven friction disc disposed therebetween whereby said friction faces will frictionally engage said driven disc upon energization of the magnet core to attract said armature.

One of the objects of the invention is a mounting arrangement of the type referred to above more particularly characterized in that it comprises a mounting dished fly-wheel plate having a central portion fixed to the flanged end of the driving shaft and a peripheral portion having substantially same diameter as the magnet core, a rear abutment annular face on said peripheral portion, the magnet core having a peripheral front abutment annular face cooperating with said rear abutment face, circumferentially disposed third apertures in said magnet core, circumferentially disposed fourth apertures in the first plate, said third and fourth apertures registering with each other, and third screws extending through said third and fourth apertures and screwed in said peripheral portion, said both abutment faces coming into axial abutment upon screwing of said third screws, said mounting plate having at least an intermediate portion extending between said central and peripheral portions and slightly axially spaced from said magnet core when said abutment faces are in relative axial abutment. Due to this arrangement the third screws are easily accessible both before and after the clutch unit is mounted on the mounting plate and the overall axial dimensions of the clutch assembly can be reduced. More particularly the mounting plate can receive passing therethrough the magnetic flux of the magnet core.

The above and other objects and features of the invention will become apparent from the following description taken in connection with the accompanying drawings which form a part of this specification, and in which.

Figure 3:
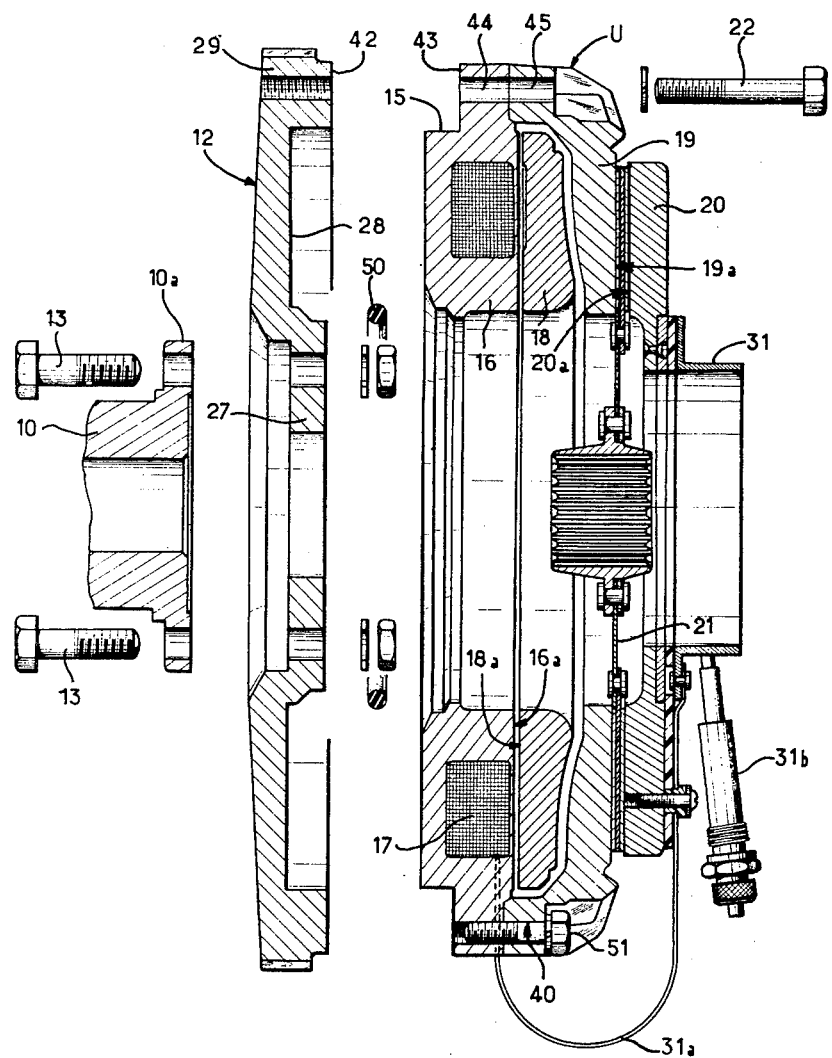
FIGURE 3 is a cross section view similar to FIGURE 1 but before mounting of the unit on the fly-wheel plate, the section being taken along line III—III of FIGURE 2.

Referring to FIGURES 1 to 4, a mounting arrangement in accordance with the invention comprises means for mounting on a flanged end 10a, so called rear end, of a driving shaft 10 an electromagnetic clutch unit U (see more particularly FIGURE 3).

The electromagnetic clutch unit U includes an annular magnet core 16, an annular armature 18, a first friction plate 19, and a second friction plate 20, while a driven friction disc 21 is disposed between plates 19 and 20 for frictional engagement thereby.

The magnet core 16 has a coil 17 having a flexible electric connection 31a with a collector ring 31 supported by the second friction plate 20 and cooperating with a feeding brush 31b. The magnet core 16 has a rear magnetic attracting face 16a.

The armature 18 is disposed rearwardly of the magnet core 16 and has a front magnetic face 18a operatively associated with the attracting face 16a of the core 16. Circumferentially disposed connecting flexible tongues 51b (see FIGURES 1, 2 and 4) connect the armature 18 with the magnet core 16 to prevent relative rotation between the armature 18 and the magnet core 16.

The first friction plate 19 is disposed rearwardly of the armature 18 and has a rear friction face 19a. Circumferentially disposed first screws 51 extend through first apertures 40 in the first friction plate 19 and are screwed in the magnet core 16 (see FIGURES 1 to 3).

The second friction plate 20 is disposed rearwardly of the first friction plate 19 and has a front friction face 20a. Circumferentially disposed second screws 51a (see FIGURES 1, 2 and 4) extend through second apertures 41 in the second friction plate 20 and are screwed in the armature 18. The driven friction disc 21 is adapted to be splined to a driven shaft 11 (see FIGURE 1) coaxial with the driving shaft and becomes frictionally engaged by the friction faces 19a and 20a of the plates 19 and 20 upon energization of the magnet core 16 to attract the armature 18.

Figure 4:
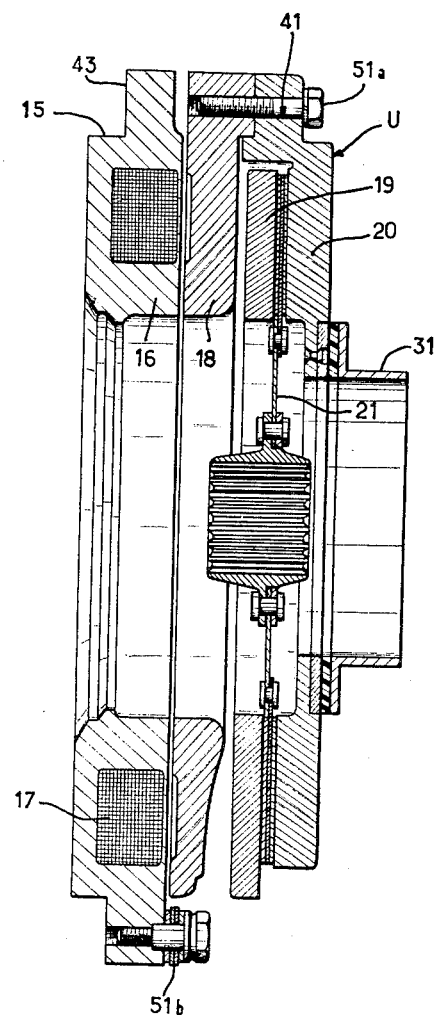
FIGURE 4 is a cross section view of the unit alone, the section being taken along line IV—IV of FIGURE 2.

It is to be noted that the clutch unit U as hereinabove described and as shown separated on FIGURES 3 and 4 can be adjusted and balanced separately under favorable conditions before assembly with the driving shaft 10.

For mouting the unit U on the driving shaft 10, a mounting dished fly-wheel plate 12 (FIGURE 3) is provided and has a central portion 27 fixed through bolt 13 to the flanged end 10a of the driving shaft 10. The plate 12 has a peripheral portion 29 the diameter of which is substantially the same as that of the magnet core 16. The peripheral portion 29 has a rear abutment annular face 42 while the magnet core 16 has a peripheral front abutment annular face 43 cooperating with the face 42 while a front cylindrical boss 15 of the magnet core is adapted to be girdled by the peripheral portion 29. Circumferentially disposed third apertures 44 are provided in the magnet core 16 while circumferentially disposed fourth apertures 45 are provided in the first friction plate 19. Apertures 44 and 45 are registering with each other. Third screws 22 are provided and are adapted to extend through apertures 42 and 43 and to be screwed in the peripheral portion 29 of the mounting plate 12.

When the screws 22 are thus screwed the boss 15 of the core is centered within the peripheral portion 29 and the abutment faces 43 and 42 come into axial abutment relation. The unit U is then mounted on the driving shaft 10 (FIGURE 1).

The mounting plate 12 has an intermediate portion 28 extending between the central portion 27 and the peripheral portion 29 and so dished as to being slightly axially spaced from the magnet core 16 when the abutment faces 42 and 43 are in relative axial abutment.

Figure 1:
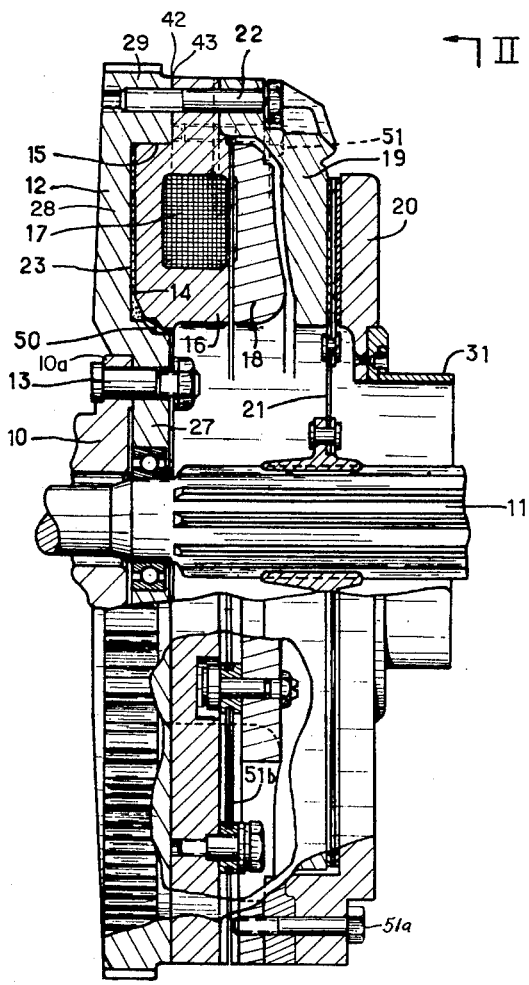
FIGURE 1 is a longitudinal cross section view of an electromagnetic clutch unit after mounting on a fly-wheel plate fixed to the driving shaft, the secton being taken along line I—I of FIGURE 2, some parts being shown in elevation, and some other parts being broken away.
Figure 2:
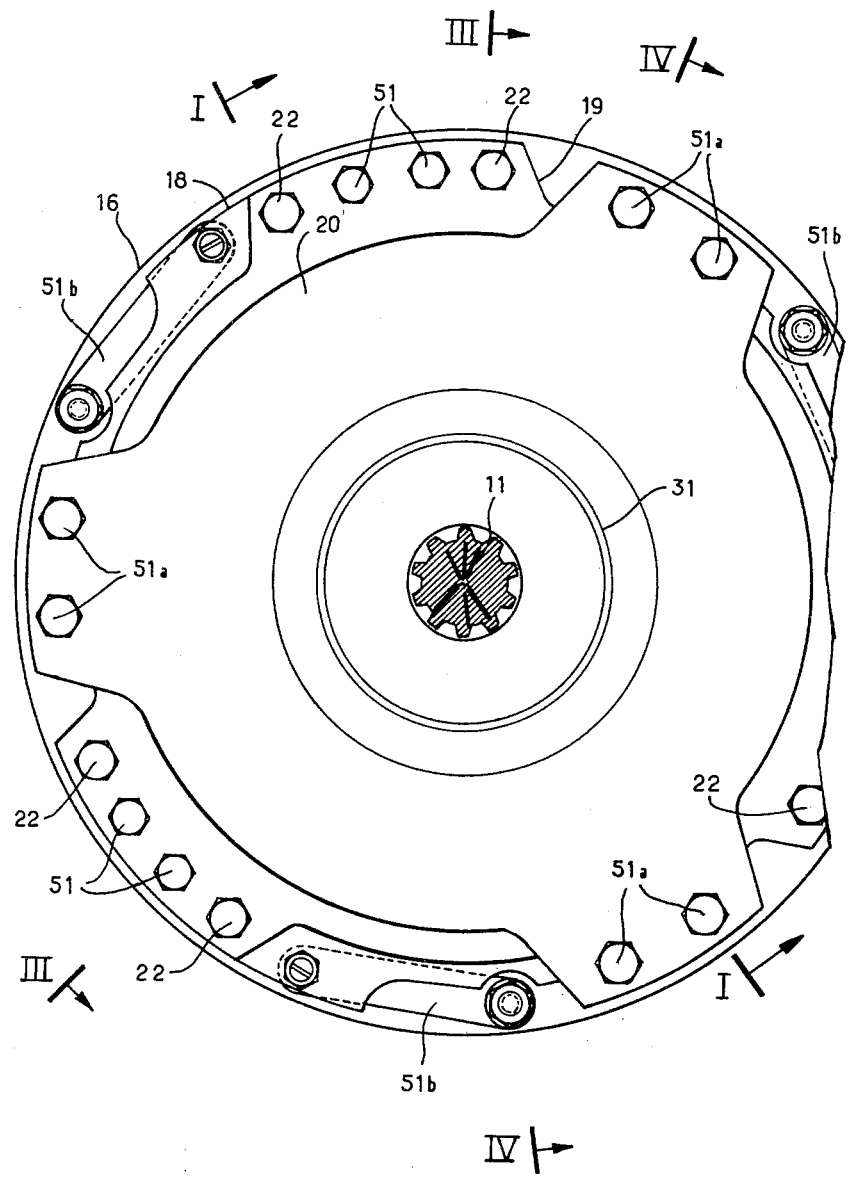
FIGURE 2 is a end view of the unit along the arrows II—II of the FIGURE 1.

In the embodiment shown on FIGURE 1, the plate 12 is magnetic and a pasty material 23 having a magnetic powder in suspension therein is disposed between the intermediate portion 28 of the mounting plate 12 and the magnet core 16 so as to fill the space between the portion 28 and the core 16 when the faces 42 and 43 abut against each other. A ring 50 is provided between the central portion 27 of the mounting plate 12 and the core 16 to prevent material 23 from escaping. The magnetic flux through the core 16 thus passes also through the material 23 and the mounting plate 12 whereby the overall axial dimensions of the clutch can be reduced.

In operation when the coil 17 is de-energized the armature 18 is not attracted towards the core 16 and the disc 21 is released between plates 19 and 20 so that the driven shaft 11 can rotate independently from the driving shaft 10. When the coil 17 is energized the armature 18 is attracted towards the core 16 and the disc 21 is frictionally engaged between plates 19 and 20 so that the driven shaft 11 rotates in unison with the driving shaft 10.

Figure 5:
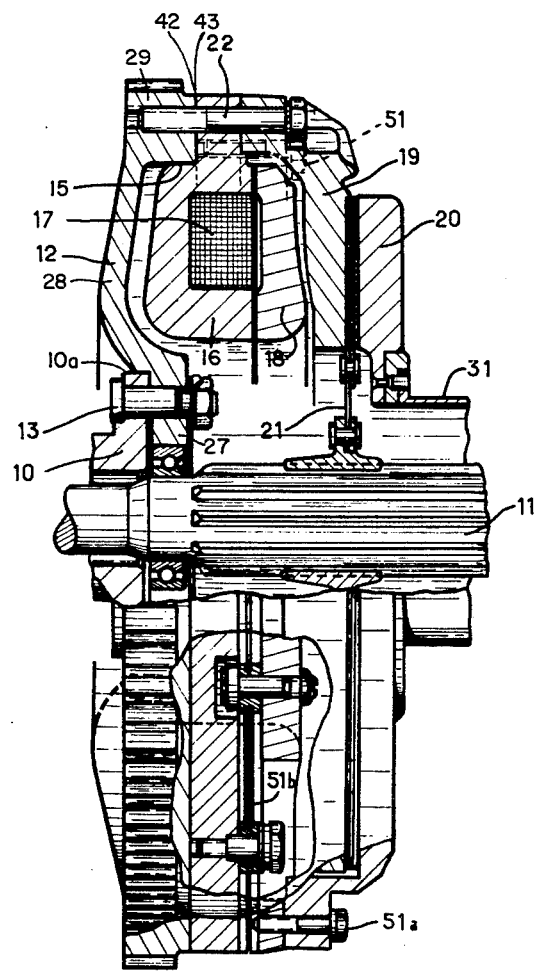
FIGURE 5 is a cross section view of a modified form of the mounting arrangement, some parts being shown in elevation, and some other parts being broken away.
Figure 6:
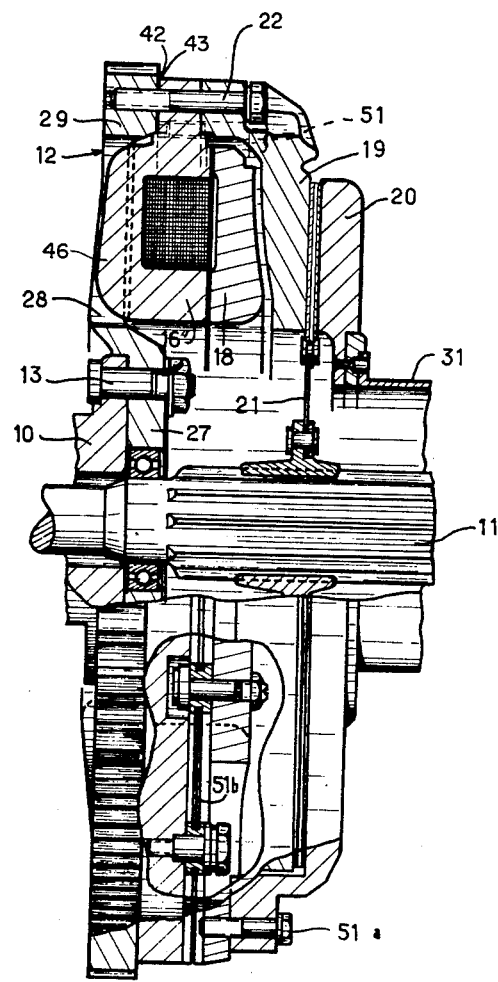
FIGURE 6 is a cross section view of another modified form of the mounting arrangement, some parts being shown in elevation and some other parts being broken away.
Figure 7:
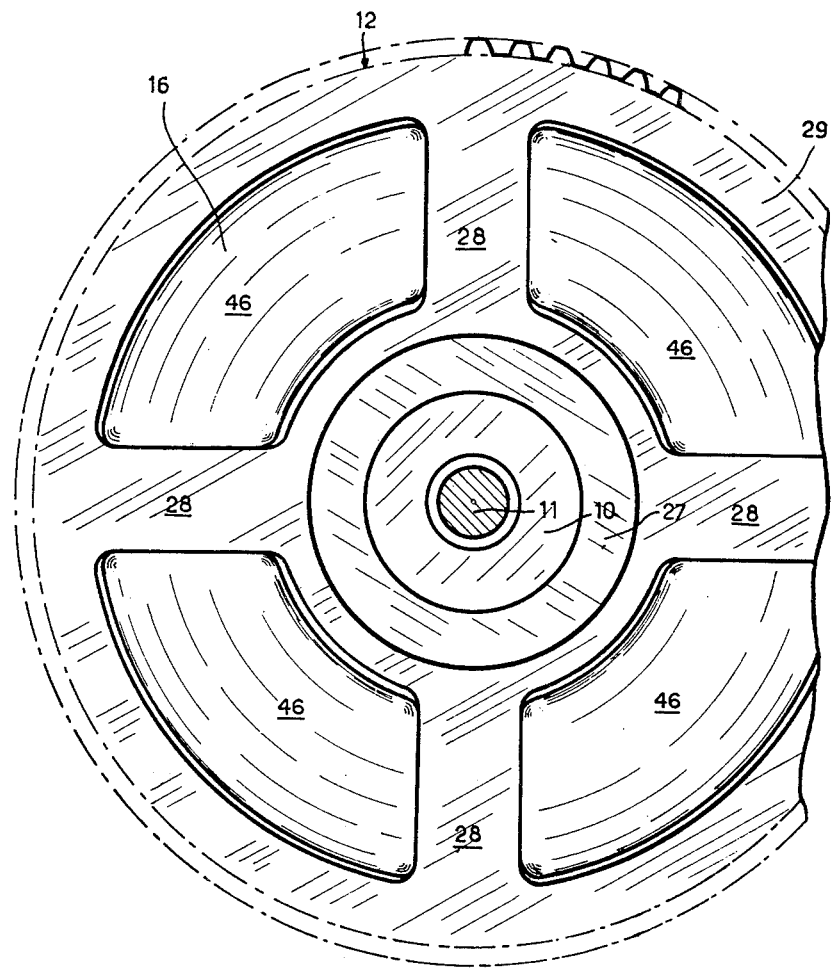
FIGURE 7 is a end view of this another modified form along the arrows VII—VII of FIGURE 6.

In the modified form shown on FIGURE 5, the arrangement is similar to that which is described with reference to FIGURES 1 to 4 and same reference members are adopted for designating similar elements in FIGURES 6 and 7 and in either FIGURES 1 to 4 or FIGURE 5, but the mounting plate 12 here comprises a plurality of intermediate portions 28 forming angularly spaced arms. The magnet core 16 has angularly spaced front projections 46 extending between the arms 28 and between the central portion 27 and the peripheral portion 29 of the mounting plate 12. The magnetic flux through the core 16 thus passes also through the arms 28 whereby the overall axial dimensions of the clutch can be reduced.

What we claim is:

1. A mounting arrangement for mounting an electromagnetic clutch unit in combination, a driving shaft having a flanged rear end for mounting said electromagnetic clutch unit thereon, said clutch unit including an annular magnet core having a rear magnetic attracting face, an annular armature disposed rearwardly of said magnet core and having a front magnetic face operatively associated with said core attracting face, circumferentially disposed connecting means connecting said armature with said magnet core to prevent relative rotation between the armature and the magnet core, a first friction plate disposed rearwardly of said armature and having a rear friction face and angularly spaced apertures disposed radially of said shaft, first screws extending through said apertures in said first friction plate and screwed in the magnet core, a second friction plate disposed rearwardly of said first friction plate and having a front friction face and angularly spaced mounting apertures disposed radially of said shaft, second screws extending through the second mentioned apertures in the second friction plate and screwed in the armature, said first and second friction faces being arranged for frictional engagement with a driven friction disc disposed therebetween whereby said friction faces will frictionally engage said driven disc upon energization of the magnet core to attract said armature, said arrangement comprising a mounting dished flywheel plate having a central portion fixed to said driving shaft flanged end and a peripheral portion having substantially the same diameter as said magnet core, a rear abutment annular face on said peripheral portion, said magnet core having a peripheral front abutment annular face cooperating with said rear abutment face and third mounting apertures angularly spaced circumferentially on said magnet core, said first plate having circumferentially disposed fourth apertures, said third and fourth apertures registering with each other, and third screws extending through said third and fourth apertures and srcewed into said peripheral portion, both of said abutment faces being disposed in position for axial abutment in assembly of said unit, and said mounting plate having at least an intermediate portion extending between said central and peripheral portions and slightly axially spaced from said magnet core when said abutment faces are in relative axial abutment.

2. A mounting arrangement according to claim 1, wherein a pasty material having a magnetic powder in suspension therein is disposed between the intermediate portion of the mounting plate and the magnet core.

3. A mounting arrangement according to claim 1, wherein said magnet core comprises a front cylindrical boss and in which said peripheral portion of the mounting plate girdles said front cylindrical boss of said magnet core.

4. A mounting arrangement according to claim 1, wherein said mounting plate has a plurality of intermediate portions forming angularly spaced arms, said magnet core having angularly spaced front projections extending between said arms and between said central and peripheral portions of the mounting plate.

References Cited in the file of this patent

UNITED STATES PATENTS

| | | |
|---|---|---|
| 2,522,622 | Laurant | Sept. 19, 1950 |
| 2,597,388 | Sensaud de Lavaud | May 20, 1952 |
| 2,605,877 | Winther | Aug. 5, 1952 |
| 2,664,981 | D'Ozouville | Jan. 5, 1954 |
| 2,822,906 | Wisman | Feb. 11, 1958 |
| 2,914,151 | Maurice et al. | Nov. 24, 1959 |
| 2,920,726 | Maurice et al. | Jan. 12, 1960 |